July 1, 1952  C. BEST  2,601,786
SAMPLING DEVICE FOR USE IN THE WEIGHING OF CIGARETTES
Filed Aug. 23, 1948  7 Sheets-Sheet 1
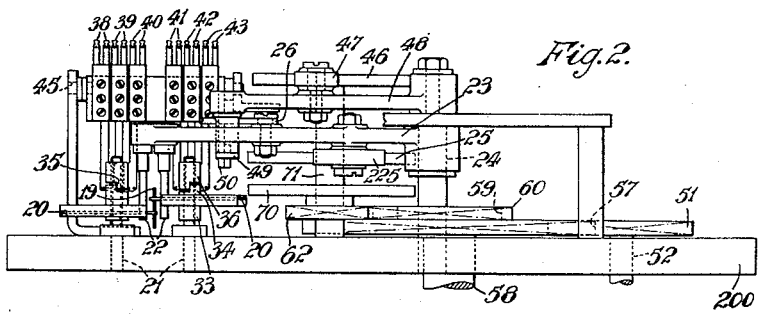
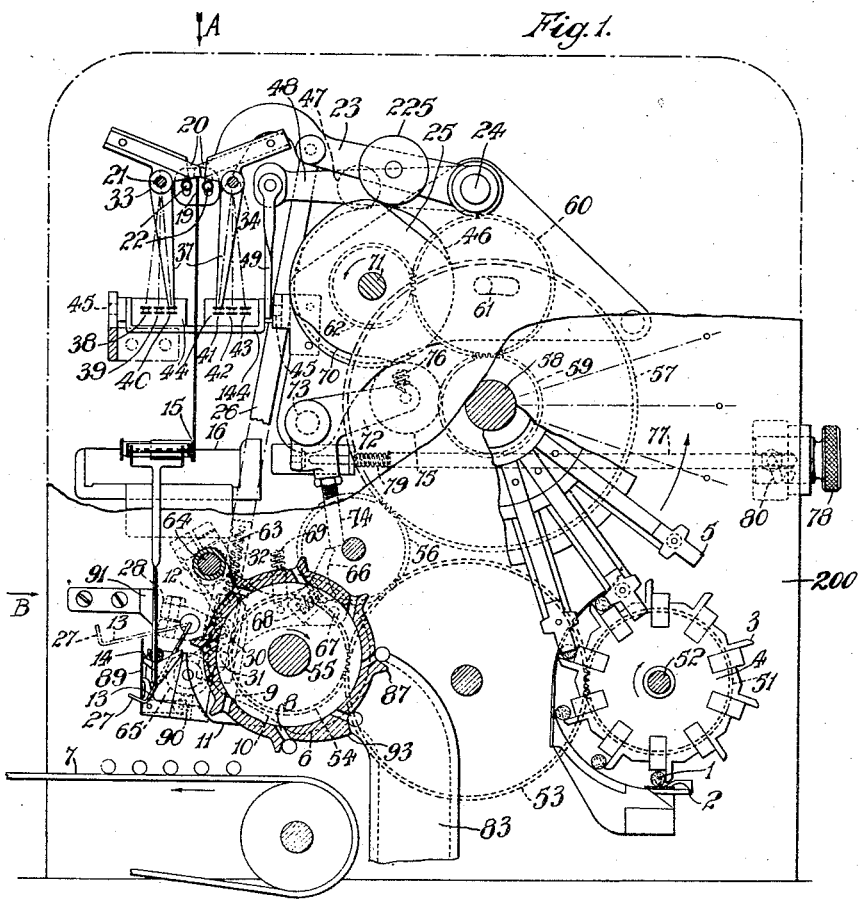
INVENTOR
Cyril Best
By Watson, Cole, Grindle & Watson

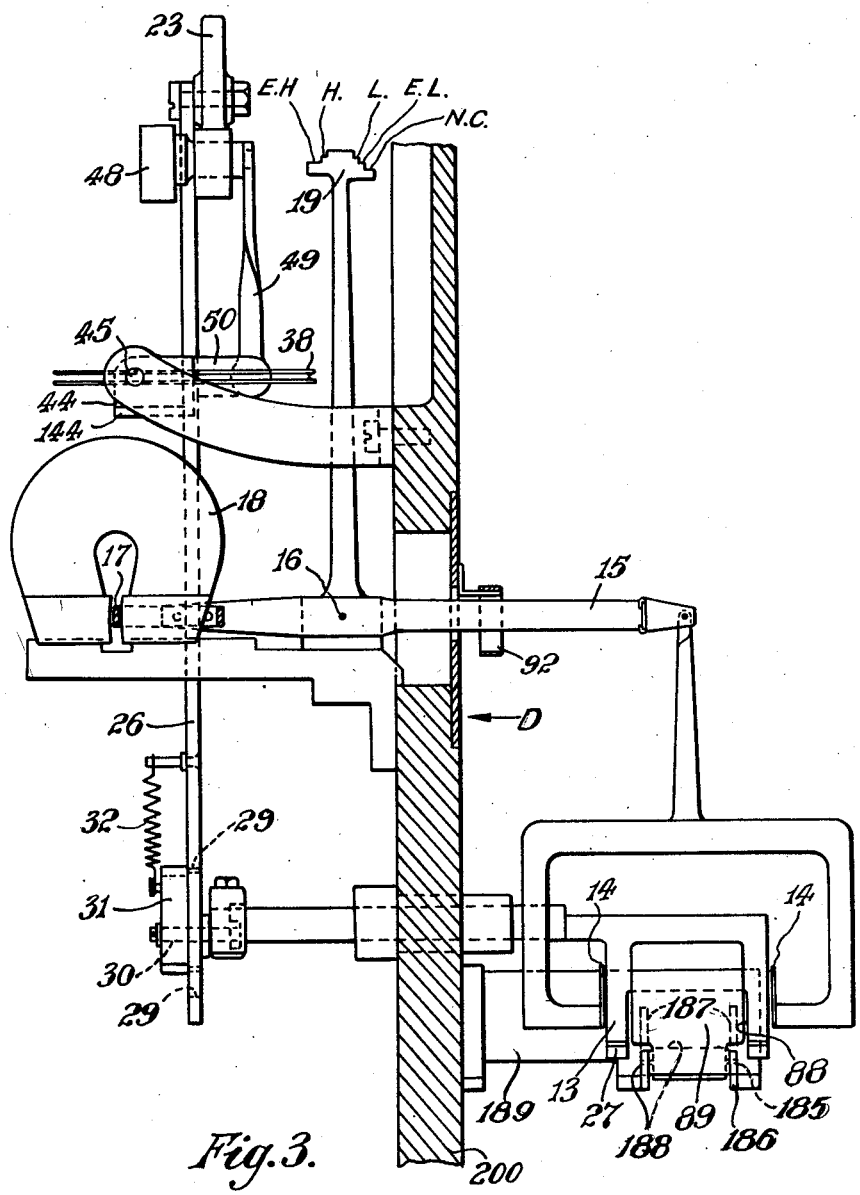

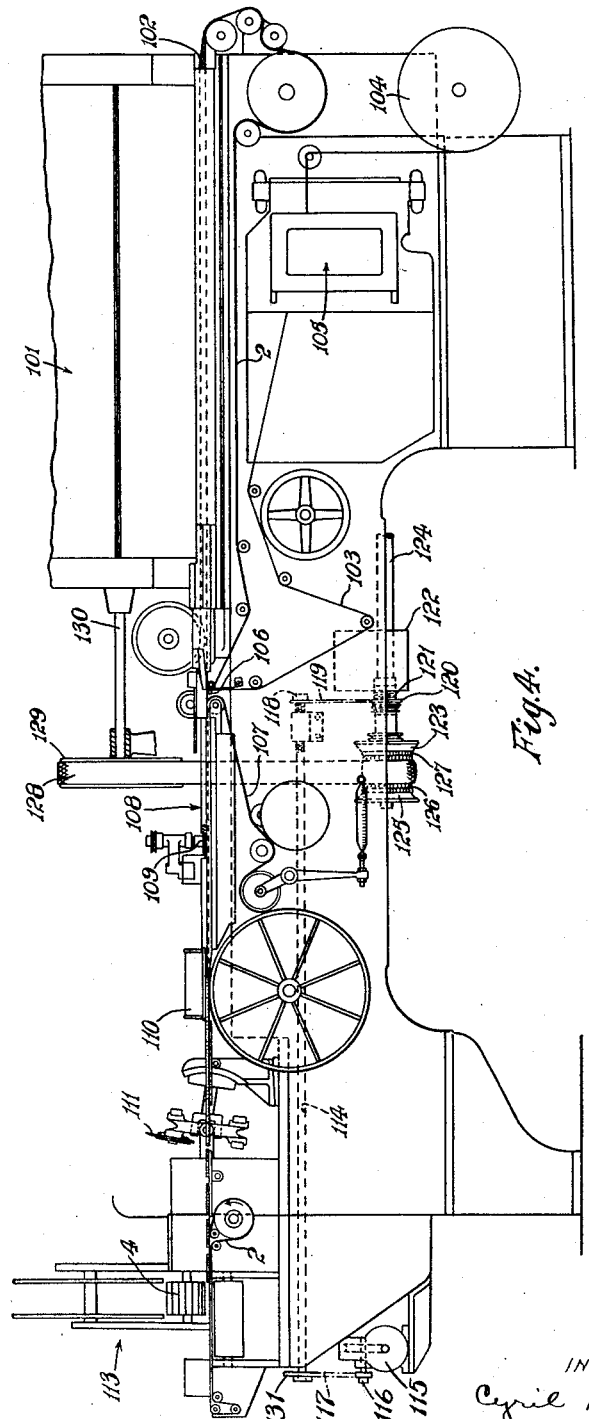

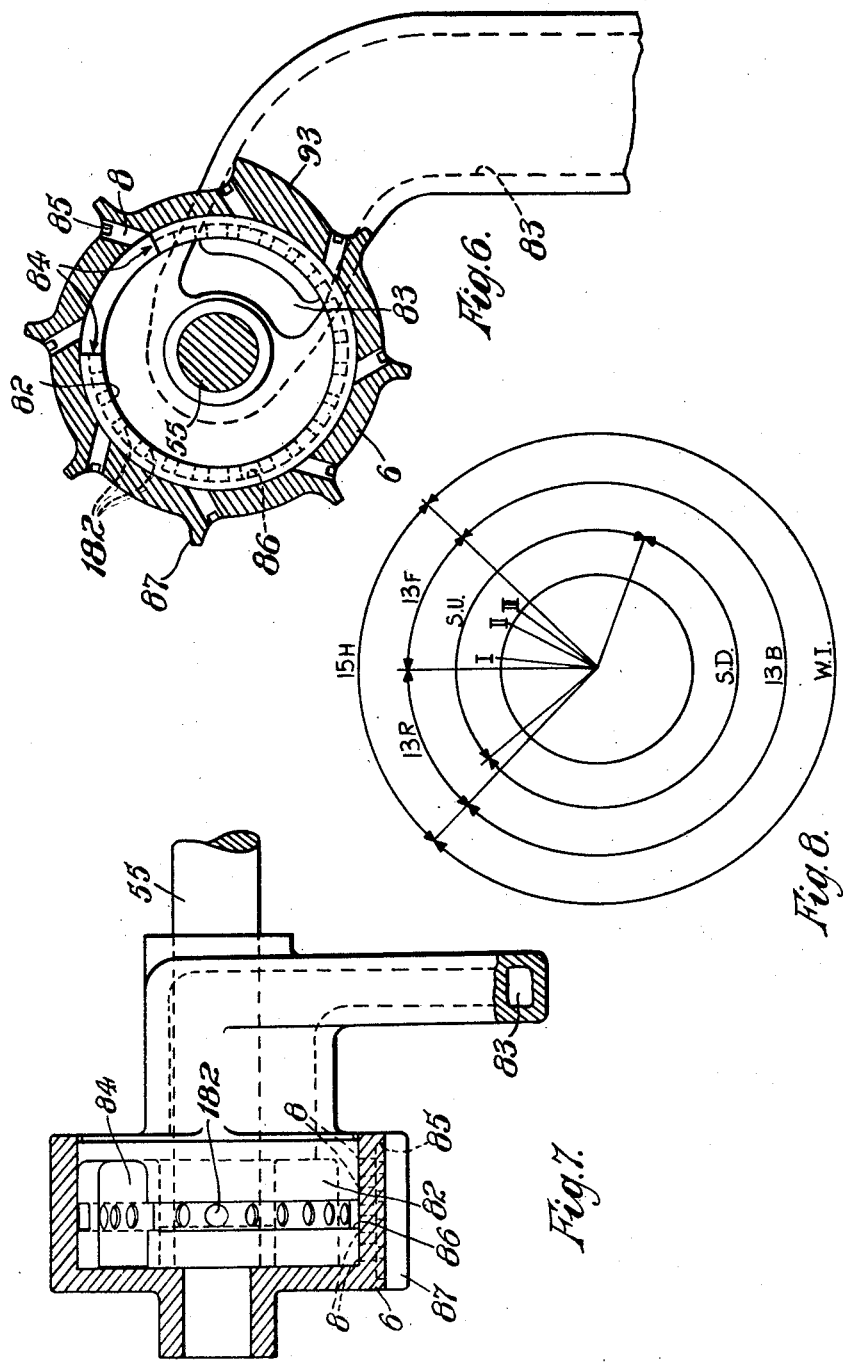

July 1, 1952     C. BEST     2,601,786
SAMPLING DEVICE FOR USE IN THE WEIGHING OF CIGARETTES
Filed Aug. 23, 1948     7 Sheets-Sheet 6

Cyril Best
INVENTOR

Watson, Cole, Grindle & Watson
Attorneys

July 1, 1952  C. BEST  2,601,786
SAMPLING DEVICE FOR USE IN THE WEIGHING OF CIGARETTES
Filed Aug. 23, 1948  7 Sheets-Sheet 7

Cyril Best
INVENTOR

Watson, Cole, Grindle & Watson
Attorneys

Patented July 1, 1952

2,601,786

UNITED STATES PATENT OFFICE 2,601,786

SAMPLING DEVICE FOR USE IN THE WEIGHING OF CIGARETTES

Cyril Best, London, England, assignor to Molins Machine Company Limited, London, England, a British company Application August 23, 1948, Serial No. 45,773
In Great Britain September 2, 1947

4 Claims. (Cl. 73—423)

This invention concerns improvements in or relating to cigarette making machines and refers more particularly to an improved apparatus for automatically controlling the tobacco feed of a cigarette making machine so as to ensure that cigarettes of consistent weight are produced.

The apparatus herein described is of the generally well known type comprising a weighing mechanism, detector means co-operating with the weigh beam thereof and movable in proportion to the amount of deflection of the weigh beam and means operatively connected to the detector means to regulate the tobacco feeding mechanism proportionately to the movement of the detector means.

In order that the tobacco feeding mechanism may be regulated much more closely than has hitherto been the practice individual cigarettes selected periodically from the output of the machine are weighed and regulation is effected in an improved manner, in accordance with the variation in weight of such cigarettes from the nominal weight of the cigarettes being produced. With the apparatus described later it is possible to effect about eighty accurate weighings per minute and where a cigarette differs from the nominal weight an electric circuit is established whereby regulation of the tobacco feed is effected in about half a second. In the construction described regulation is only effected for excessive differences in weight but it can be done for slighter differences. These effects are achieved by refinements in the weighing mechanism and the switch gear of the circuit and the employment of a reversible electric motor which instantly and accurately alters the regulating device of the tobacco feed in accordance with the detector movements.

The motor is caused to rotate the regulating shaft of the tobacco feeding apparatus in either direction when the weight of a cigarette differs from the nominal weight by more than a given amount.

The motor may be operated at different voltages and in the construction described only 8 volts is used for automatic working, the 24 volt supply being reserved for coarse adjustments by the machine operator.

The apparatus may comprise means whereby cigarettes for weighing are positively controlled throughout the whole of the operation to avoid any injury to them.

Manually controlled adjustment of the regulating shaft may be effected through the motor by operating it at the higher voltage since manual adjustment is only resorted to for comparatively coarse adjustments.

Cigarettes may be fed to the apparatus by a rotatable drum provided with suction or mechanical devices to hold cigarettes around its periphery and embodying means whereby cigarettes to be weighed are removed therefrom at a position from which they can pass to the weighing apparatus while the remainder are delivered directly to the catcher band of the machine. Where a suction drum is used means may be provided for varying the suction so that for example where it receives cigarettes the suction may be stronger than at other positions.

Change gearing may be employed in the driving mechanism of the drum so that the proportion of cigarettes weighed to total output may be varied.

One way of carrying the invention into effect will be described with reference to the accompanying drawings in which:

Figure 1 is a side elevation of the essential parts of the apparatus, partly in section and with a support frame broken away to show hidden parts.

Figure 2 is a plan view of part of Figure 1, looking in the direction of the arrow A.

Figure 3 is an end view of part of Figure 1, looking in the direction of the arrow B.

Figure 4 is a small scale view of a typical cigarette making machine to which the invention is applied.

Figure 6 is a front elevation, partly in section of a suction drum used with the apparatus.

Figure 7 is a side elevation of Figure 6 partly in section.

Figure 8 is a timing diagram.

Figure 5:
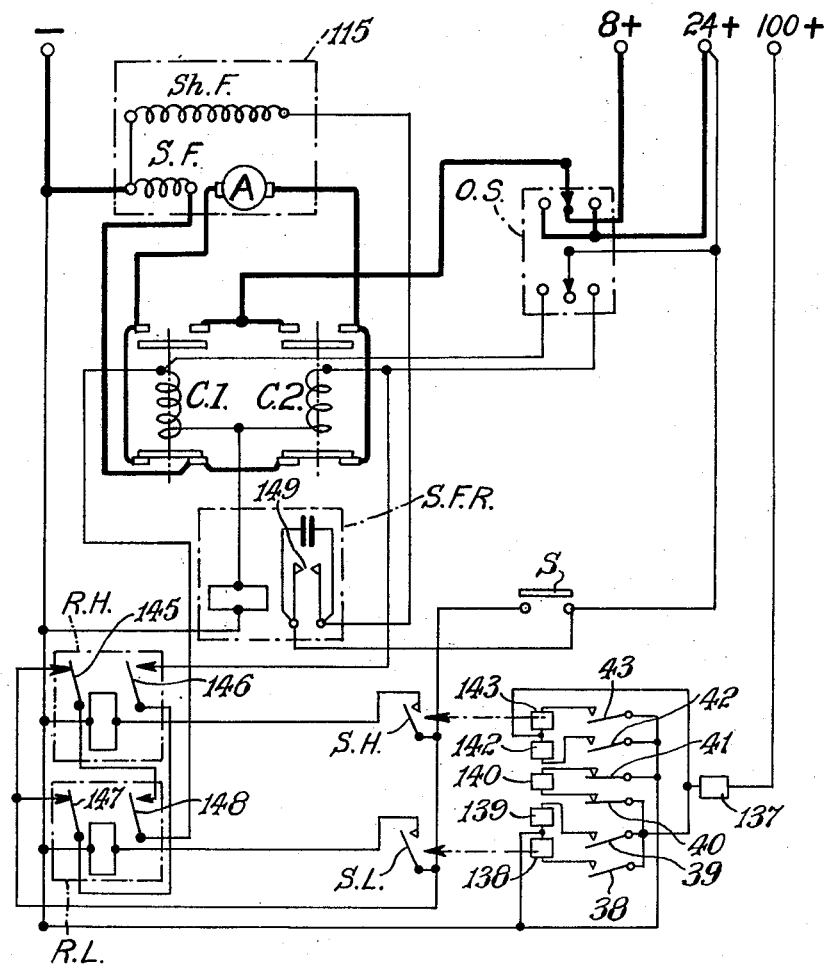
Figure 5 is a diagram of the electrical connections of the apparatus.

Referring to Figures 1 to 3, all the parts of the apparatus are supported, directly or indirectly, on a support frame 200. Cigarettes 1, which are produced by the machine shown in Figure 4, are swept from a conveyor belt 2 forming a part of said machine, by blades 3 on a deflector wheel 4 and delivered between feeler arms 5 which test the softness of the ends in a well known manner and after passing around with said arms the cigarettes are delivered to a suction drum 6 provided with a stripping device described below whereby certain cigarettes are selected for weighing, the others being discharged on to a catcher band 7.

In the example being described the cigarettes produced by the machine are so manipulated that, one out of every sixteen produced is weighed. The suction drum rotates clockwise as viewed from the front of the apparatus and feeds the cigarettes downwards towards the catcher band and is provided with eight sets of suction apertures 8 spaced at equal angles around the drum for holding the cigarettes on the periphery of the drum. The drum rotates through two revolutions for each cigarette selected, the remainder being discharged directly on to the catcher band of the machine. At each side of the drum there is pivoted a downwardly depending stripper plate 9, see also Figures 11 and 12, the two plates being fixed together and operated by a cam 10 so that during most of the time occupied by the two revolutions of the suction drum the lower ends 11 of the stripper plates which constitute operative faces lie outside the periphery of the drum and strip the cigarettes from the drum, but when a cigarette is to be weighed the plates move in a little and the cigarette instead of being stripped, to fall on the catcher band, continues to move upwards with the drum until it is stripped therefrom by the upper surfaces 12 of the plates. These are so shaped that the cigarette is gently stripped and rolls, as more exactly described later with reference to Figure 13, on to a pivoted plate 13 which leads it on to the pan 14 of the weighing machine. The pan consists merely of two V-shaped supports suitably spaced to support a cigarette lengthwise in a satisfactory manner.

The weighing apparatus Figure 3 is of known kind and consists of a weigh beam 15 suspended on a taut wire 16 and having the pan 14 pivoted at one end. The other end of the beam has a loop 17 of copper or the like fixed to it which is of such weight as to counterpoise a cigarette of exact weight and the loop moves in a magnetic field provided by a magnet 18 whereby the beam movements are damped.

The beam 15 of the weigher comprises a deflection plate 19 which moves with the beam and has a flat and normally horizontal top and a series of steps on each side edge. Pivoted feelers 20, mounted on pivots 21, one for each series of steps are provided and these are provided with knife edges and arranged to engage with the deflection plate when the beam has reached equilibrium in a weighing operation. If the cigarette is of correct weight the top of the plate is horizontal and both feelers engage the top. This condition is shown in the drawings. If a cigarette is light one feeler engages the top and the other engages one of the steps. Two steps are provided at each side namely, light and extra light, L and EL respectively, on one side of the plate and heavy and extra heavy, H and EH respectively, on the other side. In addition the "light" side of the plate has a third step, NC for "no cigarette" which comes into contact with the corresponding feeler when the beam has an abnormal tilt because there is not a cigarette in the pan. The feelers move into contact with the plate after the beam has deflected in weighing and reached equilibrium, or nearly, and usually the beam has become stationary before the feelers touch it but in any case the beam is practically in its final position and is steadied and held by the feelers. The feelers remain in this position and the beam is held until a cigarette for the next weighing is to be delivered to the pan, which event occurs almost simultaneously with the removal of the one in the pan. The feelers are lifted by pins 22 attached to a lever 23 pivoted at 24 and raised by a cam 25 which engages a roller 225 on the lever 23 and for convenience the cam in question, though it also performs another function will be termed the feeler cam. This cam is driven by gearing described below so that it revolves once for every two revolutions of the suction drum. As soon as the feelers are lifted from the deflection plate the beam is released and weighing commences. The beam is held for about a quarter of the revolution of the cam and the remainder of the cam movement is devoted to weighing so as to give as long a time as possible for this.

The pivoted plate 13 previously mentioned which leads a cigarette to the pan of the weigher is operated by a link 26 pivotally attached to the above mentioned cam operated lever 23 and is thus moved in timed relationship with the feeler lifting device and operated by the feeler cam. The plate 13 is a flat piece with short projections 27 extending therefrom at its lower end at about 90° to form a cigarette support, and to its pivot there is fixed a lever 28 to which the aforesaid link is attached. The lower end of the link 26 has a long slot 29 in it and a pin 30 fixed to the lever 28 is pivoted in a block 31 movable in the link slot but held by a spring 32 so that normally it moves therewith but in the event of a jam the springs allow the block to move in the slot and prevent damage to the parts.

Figure 9:
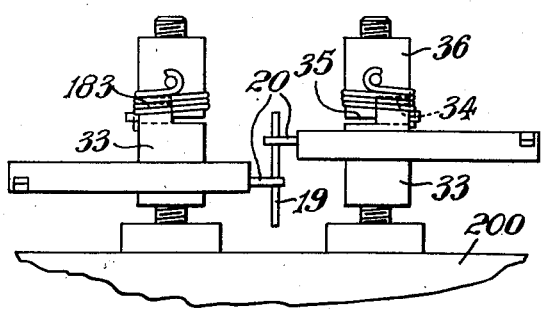
Figure 9 is a fragment of Figure 2, showing certain parts more clearly.
Figure 10:
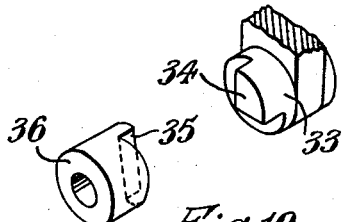
Figure 10 is a perspective diagram showing how parts in Figure 9 cooperate.

The feeler pivots 21 are at about equal distances on either side of the plane in which the weight beam swings, and each feeler has a hub 33 at the pivot on which a torsion spring 183, see Figure 9, is attached. The hub 33 is formed with a quadrant shaped step 34, see also Figure 10, which can engage with the edges of a diametral step 35 formed on a coaxial hub 36. Thus there is a slight degree of flexibility between the hubs due to the torsion springs but the degree of possible movement is limited by the steps. To each hub 36 there is attached a downwardly depending rod or the like 37 movable angularly with the feeler as the latter is moved on the pivot by the torsion spring when the feeler cam allows the feelers to move. These rods which may be of insulating material, are adapted to close electrical switches as will now be explained.

It will be observed that the free end of a depending rod occupies a certain position determined by the feeler position, and under normal circumstances will be in one of three positions indicated by chain lines in Figure 1 according to the part of the deflection plate engaged by the feeler.

Beneath each such position is mounted a spring switch 38, 39, 40, 41, 42, 43 respectively and these switches (six in all) are mounted on insulating blocks 44 fixed to a support bracket 144 which is pivoted at 45 and periodically operated by a cam 46 (the switch cam), fixed on the feeler cam spindle 71, to press the switches against the rods. The switch cam engages a roller 47 on a cam lever 48 pivoted at 24 and the free end of the lever is connected by a link 49 to an arm 50 projecting from the support 144. When the support 144 is raised by the cam 46 the particular switches closed by the rods 37 make an electric circuit and this causes regulation of the tobacco feed to be effect as described at the end of the specification.

The rotary parts above described are all driven by gearing in the following manner.

A gear wheel 51 fixed on the spindle 52 of the deflector wheel 4 engages a large gear wheel 53 which also engages a gear wheel 54 fixed to the spindle 55 of the suction drum and an idler gear wheel 56. The latter engages a large gear wheel 57 fixed to the spindle 58 about which the feelers 5 rotate and on this spindle is fixed a small gear wheel 59. The wheel 59 engages an idler gear wheel 60 whose axis can be moved in a slot 61 concentric with the axis of the gear wheel 59. The idler gear wheel engages a smaller gear wheel 62 fixed to the spindle 71 of the feeler and switch cams 25 and 46 which spindle also carries another cam 70, described below, which controls movements of the stripper 9 and thereby the number of cigarettes selected for weighing. All the spindles just referred to are journaled in the frame 200. This last mentioned gear wheel can be changed in order to vary the proportion of cigarettes selected for weighing. With the arrangement shown one cigarette is weighed from every sixteen produced. Other suitable proportions are one in twenty-four by using a gear wheel one and a half times as large as the gear wheel 62 shown, or one in thirty-two by using a gear wheel twice as large. The idler gear wheel 60 is shifted in the slot 61 to couple the gear wheel 59 with whatever size gear wheel is used at 62.

Figure 12:
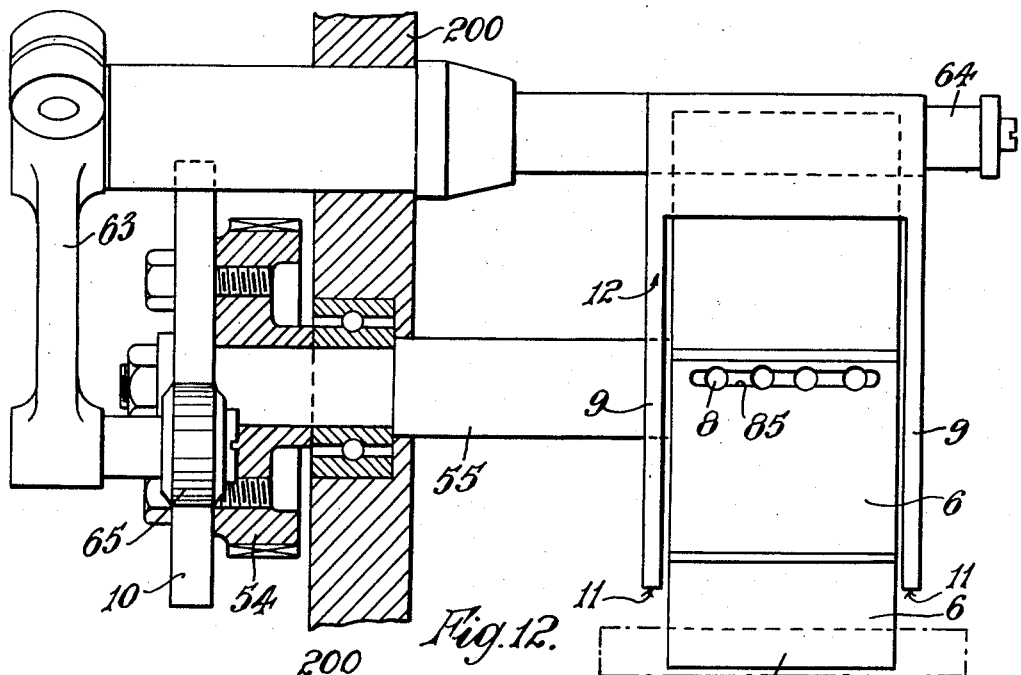
Figure 12 is a view of Figure 11 looking in the direction of the arrow C.
Figure 11:
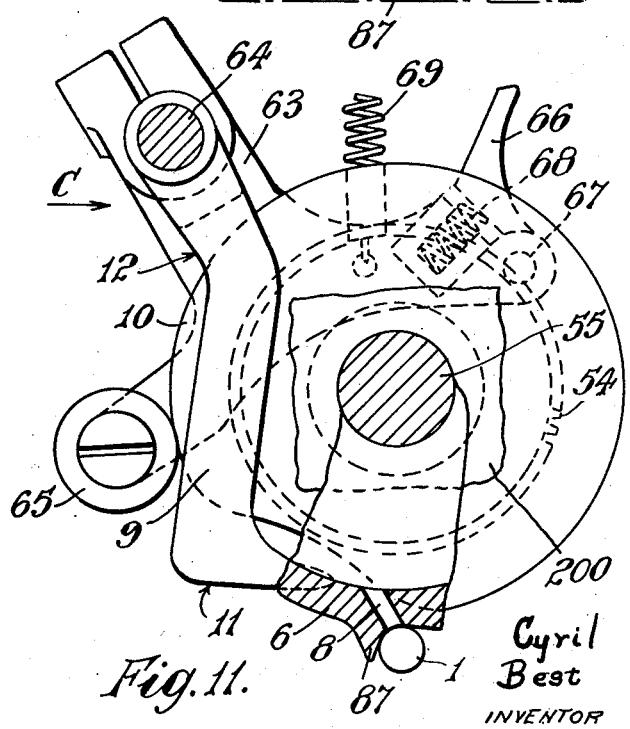
Figure 11 is an enlarged view of certain parts shown in Figure 1.

The stripper 9, shown more clearly in Figures 11 and 12, is operated by its cam 10 through a three armed lever 63 which is pivoted at 64 at the end of one arm and has a cam roller 65 at the end of the second arm and a spring pressed pawl 66 pivoted at 67 on the end of the third. A spring 68 urges the pawl outwards from the three armed lever subject to a stop (not shown) which limits the amount of movement. When the cam 10, which is fixed to the spindle of the suction drum 6 rotates, the roller 65 is held in contact with the cam (subject to control effected through the pawl as described below) by means of a spring 69 and thus the stripper is moved in and out at the proper times. As two revolutions of the suction drum take place for each stripper movement the pawl is arranged to control the operation of the three armed lever to effect one movement of the stripper for each two revolutions of the cam in the following manner:

Another cam 70 which will be termed the stripper stop cam, is fixed on the same shaft 71 as the feeler cam. This stop cam engages a roller 75 on a lever 72 pivoted at 73 and provided with a downwardly depending rod or stop rod 74 adapted to engage the tip of the pawl 66 on the three armed lever 63. At each weighing operation, therefore, the stop cam permits a spring 76 to actuate its lever to shift the rod so that the three armed lever can move on its pivot and allow the roller 65 to be moved by the spring 69 into engagement with the stripper cam 10. As however the stop rod is only shifted once for each two revolutions of the stripper cam, cigarettes are only fed to the pan of the weigher at every second revolution of the drum.

As the roller 75 on the pivoted lever 72 which carries the stop rod 74 is held in operative engagement with the cam 70 by the spring 76 advantage is taken of this device to provide a simple means whereby weighing operations may be stopped although the cigarette machine continues to run. A rod 77 (the starting rod) is supported for axial movement in the frame of the apparatus and moved by operation of a hand knob 78 to press under the influence of a spring 79, against an abutment on the lever 72 which carries the stop rod 74, and when this is done the stop rod 74 is held so as to engage the pawl 66 of the three armed lever so that all cigarettes are stripped at the lower part of the drum and fall on to the catcher band. The knob is arranged for rotation and comprises a screw or a cam 80 to effect axial movement of the starting rod, the rod being held in the inoperative position by the spring 79.

A cigarette machine has several suction devices incorporated in it and to economize in suction the drum 6 is specially constructed as shown in Figures 6 and 7 so as to operate at a minimum. The drum, which is a hollow cylinder with one complete end face, as shown in Figure 7, is fixed on the spindle 55, so as to rotate on a fixed boss 82 whose diameter is substantially that of the interior of the drum, with a trifling clearance. At the position where the cigarettes are received by the drum the boss 82 which is perforated as shown by holes 182 and forms part of a duct 83 of the suction system, is cut away at 84 so as to expose the whole of a set of the suction apertures 8, which in the present construction comprise four, see also Figure 12, spaced along the length of the drum and communicating with a groove 85 in the periphery of the drum similarly located and extending just beyond the outer holes see Figure 7. Thus at the position in question suction occurs through the groove and four holes. The cut away part of the boss extends circumferentially for about the space occupied by three of the holes 182 and the spaces between them, but thereafter the boss is so constructed by having a circumferential groove 86 that only the two inner apertures 8 of a set are exposed to suction. Thus strong suction is provided to ensure that cigarettes properly adhere to the drum and thereafter the weaker suction is sufficient to hold them to the drum and allows them to be easily stripped. In addition to the apertures the drum periphery has a tooth 87 in front of each set, considered in the direction of rotation, the tooth being substantially of the shape of a sprocket wheel tooth and forming a shoulder in which a cigarette can nest.

These teeth also serve to sweep cigarettes back along the catcher band 7 should the latter become overloaded through failure to remove cigarettes therefrom.

Referring now to Figure 4 of the drawings the cigarette machine is provided with a tobacco feeding apparatus 101 which showers tobacco on a travelling endless belt 102. The paper web 103 is drawn from a reel 104 over the various rollers shown, passing through a printer or the like 105 and finally over a small roller 106 which leads it on to an endless tape 107. The tobacco on the belt 102 is delivered on to the paper web 103 at the position occupied by the roller 106 and the tape 107 carries the loaded web through the folders and other devices indicated by the reference 108 where the paper is wrapped around the tobacco core to form a continuous cigarette rod. The edges of the paper are secured together by paste from a paster 109 whereafter the rod passes beneath a heater 110 which dries the paste after which the rod is severed into separate cigarettes by a cut-off 111. These cigarettes pass on to an endless travelling tape, the aforementioned conveyor 2, which carries them to the deflector wheel 4 where the deflector blades move the cigarettes out of the rod line and deliver them to the mechanism previously described and which is diagrammatically indicated in Figure 4 at 113.

In order to vary the feed of tobacco to the belt 102, should the weights of the cigarettes produced deviate too much from the desired weight, there is provided a speed regulating shaft 114 which is rotated in either direction by a reversible electric motor 115 through reduction gearing. A geared motor is preferably used, as shown, and a sprocket wheel 116 on its shaft is connected by a chain 117 to a larger sprocket wheel 131 on the shaft 114. At the other end of the shaft 114 there is fixed a sprocket wheel 118 which is connected by a chain 119 to another sprocket wheel 120. This latter sprocket wheel is fixed to a screwed bush 121 so that rotation of the wheel screws the bush into or out of a bearing bracket 122 thus moving a slidable cone shaped wheel 123 which forms part of a variable drive pulley and is splined to the main shaft 124 of the cigarette machine. The other cone wheel 125 is fixed on the main shaft 124 and between the cones there are a number of segments 126 which are held together by springs 127 so that as the bush 121 moves in and out, the pulley expands or contracts. A belt 128 passes round the segments 126 and over a pulley 129 which is fixed on a shaft 130 and forms the driving shaft for the tobacco feeding apparatus 101. A jockey pulley is interposed to take up slack in the belt but this is omitted from the drawings.

The connections for the motor 115 and the switches 38 to 43 are shown in Figure 5. The motor 115 is compound wound having an armature, a series field S. F. and a shunt field Sh. F. and is dynamically braked. A D. C. supply at 8 volts is provided between the terminals marked 8+ and —, and an alternative D. C. supply at 24 volts is provided between the terminal marked 24+ and the negative. A further supply at 100 volts is available between the terminals marked 100+ and the negative and this supply is for operating electric counters, one 137 for showing the total number of cigarettes weighed and five others 138, 139, 140, 142 and 143 for showing how the total is divided among extra-light, light, correct, heavy and extra-heavy cigarettes. The 100 volt supply is used because commercially available counters operate at this voltage. A switch S is provided which is closed when the cigarette machine is running at its proper speed to ensure that regulation takes place only when the machine is in proper operation.

The motor is started and stopped by two contactors C1 and C2 and these in turn are energized through relays RL and RH which have their coils energized when a switch SL or SH respectively is closed. These switches are mechanically coupled to the appropriate counters, as indicated by the dotted arrows, and are in fact integral parts of said counters. The counters 138 to 143 are actuated when the switch rods 37 are caused to close two of the switches 38 to 43 when weighing takes place. The switches are indicated in Figure 5 and the middle two 40 and 41 are shown closed, corresponding to the correct weight as previously described in connection with Figures 1 to 3. It will be seen then that current flows from 100+ through the total counter 137 and through switches 40 and 41 thus also operating the "correct" counter 140, the return to negative being through the switch 41. That is all that happens when a cigarette is of correct weight.

Supposing, however, that an extra-heavy cigarette is weighed, the switch SH is closed by the operation of the counter 143 the circuit being from 100+ through counter 137, counter 143, switch 43 to negative. As the switch S is already closed the 24 volt supply is connected through SH to one side of the coil of the relay RH, the other side of the coil being connected to the negative. The switch arms 145 and 146 of the relay move over to the other position and thus there is a connection for the coil of the contactor C2 from 24+ through S and a switch arm 147 of the relay RL through arm 146 to C2 and thence through the coil of a shunt field relay SFR to the negative. The shunt field relay closes its contacts 149 and the shunt field winding is energized. The bars of contactor C2 move up and the armature and series field of the motor 115 are supplied with current from the 8 volt supply, the circuit being from 8+ through the top bar of the contactor to the armature and then to the lower bar of contactor C1 and the series field and back to the negative.

As the shunt field is already connected the motor starts as a compound motor and moves the regulating shaft 114.

As the switch rods 37 break contact the relay RH and contactor C2 are de-energized and the contactor bars move back to the position shown. As is clear from the drawing the armature is short-circuited through the lower bars of the two contactors and as the shunt field is still existing because the shunt field relay is slugged the motor is instantly stopped by dynamic braking.

The closing of the switch 38 due to an extra-light cigarette causes the motor to start in the opposite direction and to be thereafter braked exactly as described above.

Other details of the apparatus and the electrical circuit will be dealt with in the following description of the operation of the apparatus.

When the cigarette machine is working, all the cigarettes produced are removed from the rod line and delivered to the feeler arm 5. It may be that at times a cigarette is rejected by the apparatus to which the feeler arms 5 belong and on rare occasions such a rejected cigarette will be one that should have been ultimately delivered to the pan of the weigher but further reference to this event will be deferred.

All the cigarettes supported between the feeler arms are delivered in turn to the suction drum 6 which is geared as described to the spindle 58 of said apparatus, and are removed from the drum by the stripper 9 so that they fall on to the catcher band if it is not desired to weigh any of them.

The drum 6 is designed for high speed working as described, but in setting up and adjusting the apparatus by hand the cigarette for weighing will not always move exactly in the manner described, that is, it does not move quickly enough and for this reason that tooth of the drum following the one which always corresponds to delivery for weighing comprises a cam surface 93 which ensures that the cigarette to be delivered to the pivoted plate does not fall between the plate and the periphery of the drum extending between the two neighboring teeth thereof. While this device is of doubtful utility in full-speed operation it, at any rate, does no harm.

Figures 13, 14:
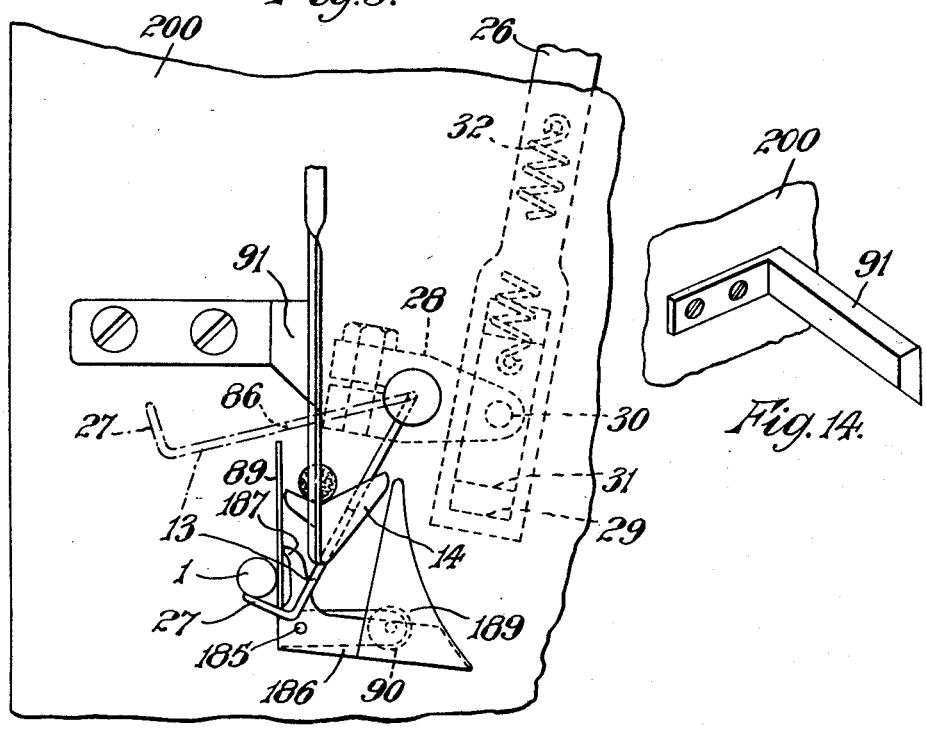
Figure 13 is an enlarged view of certain parts shown in Figure 1.
Figure 14 is a perspective view showing one part of Figure 13.

If it is desired to commence weighing operations the starting rod 77 is retracted by twisting its knob 78. This allows the three armed lever 63 to function and, as determined by the stop rod control 74, one cigarette from each sixteen is delivered to the pan 14 of the weigher. Such delivery is effected by the movement of the stripper as previously described, and as a cigarette is stripped for weighing by the surfaces 12 of the stripper plates 9, the pivoted plate 13 is moved on its pivot from the chain-line position toward and slightly beyond the full-line position, Figures 1 and 13, and guides the cigarette into the pan 14. The lower end of the plate 13 is forked at 88, see Figures 3 and 13, and between the forked part there is arranged a pivoted control plate 89 which is pivoted at 185 and weighted at 90 so that movement of the control plate in the anti-clockwise direction lifts the weight. The pivots 185 are supported in side plates 186 which extend upward, as best seen in Figure 13, to form stops at 187 to check clockwise movement of the plate 89 about its pivots. The side plates 186 are fixed at each side of a recess 188, Figure 3, formed in the bottom of a guide member 189 which extends outward from the support frame 200. As a cigarette is stripped from the drum 6 and received on the pivoted plate 13 it is checked by a fixed stop 91 which forms a V-shaped support with the pivoted plate 13 so that the cigarette is temporarily held at the right of the stop 91 in Figure 13. As the plate 13 moves down to deliver the cigarette into the pan 14 the cigarette slowly moves out of engagement with the stop 91 and moves over the pivoted plate 13 into the pan 14. It should be noted that in Figure 13 a cigarette is in the pan, so that the latter is in its lower position, and further, that the plate 13 in full-lines is also nearly at its down position. When, however, the plate 13 rises toward the chain-line position it removes the cigarette from the pan as described more fully in the next paragraph and so the pan rises and is thus ready to receive a cigarette as one rolls down the plate 13 as soon as it is free of the stop 91. As the cigarette moves down the plate 13, as soon as it can pass the stop 91, it contacts with the right-hand side of plate 89 and thus can swing the latter slightly on its pivots but the plate remains substantially in the position shown, under the influence of its weight and guides the cigarette supported on the plate 13 into the pan 14. The plate therefore functions as a resilient and gentle guide for the cigarette. In this way the cigarette is practically checked from any free movement and cannot be injured.

Assuming that a cigarette is already in the pan as one is being delivered thereto, which will be the case when the apparatus is in normal operation, the last portion of the upward movement of the pivoted plate 13 will lift said cigarette out of the pan an instant before it delivers the other to the pan. The lifted cigarette first contacts the bevelled side of the stop 91 and then rolls down the plate 13 and is held for a time by the projections 27 at the lower end thereof and then falls on to the catcher band 7 at the lowest position of the plate 13 as the plate 13 moves past plate 89.

A cigarette just about to be stripped from the projections 27 as the forks of the plate 13 move past the plate 89 is shown in Figure 13 as a circle resting between the projections 27 and the plate 89.

During all these movements the weigh beam 15 is held by the feelers 20 and when a fresh cigarette is properly in the pan the feeler cam 25 lifts the feelers and allows the weigh-beam to take up a balanced position. While this is happening the pivoted plate 13 moves down to its lowest position and discharges the cigarette supported in the projections 27 on to the catcher band.

Weighing takes place as aforesaid during about three quarters of a revolution of the feeler cam and then the cam permits the feelers to fall and hold the beam. The pivoted plate 13 starts to rise again towards the end of the weighing interval ready to repeat the operations described above.

The movements can be followed from Figure 8 which shows the sequence of operations for an average setting of the apparatus and where 15H stands for beam 15 held, 13F for plate 13 falling, 13R for plate 13 rising, 13B for plate 13 dwelling at bottom. WI stands for weighing interval and SU for switch block up and SD for switch block down. I indicates the position where a cigarette rolls from drum 6 on to the plate 13, II where said cigarette falls into pan 14 and III where the preceding weighed cigarette is stripped from the plate 13 by the control plate 89 and drops on to the catcher band 7.

As soon as the beam is held by the feelers the switch cam lifts the switch block, and such switches as are in alignment with the depending rods 37, of the feelers are pressed thereby. If the weight is correct both feelers will be on the top of the deflection plate and as the two corresponding switches 40 and 41 are in series a current flows and operates the total and correct counters as previously explained. If however the cigarette is incorrect (e. g. light) one feeler rests on the top of the deflection plate and the other on the light step of the plate. There is no circuit through the switch on which the rod of the first said feeler is pressing but there is one through the light switch and a current flows. This operates a light counter and also the total counter. A similar arrangement is provided for extra-light cigarettes, when of course one feeler rests on the extra-light step. Moreover, the extra-light switch actuates the relay RL and the motor thereupon starts. Regulation of the tobacco feeding rate takes place until the lifting of the feelers for the next cycle of operations breaks the circuit and the motor is stopped by the opening of its contactor aided by dynamic braking. Similarly a heavy cigarette causes the recording of a heavy weighing and the operation of the total counter and an extra-heavy cigarette causes the operation of an extra-heavy counter and total counter and also the movement of the motor in the opposite direction through the other coil of the contactor. It will be noted that regulation of the feed takes place for a constant time and is determined by the part of the feeler cam which allows the feelers to rest on the deflection plate.

When as referred to above a cigarette which should be weighed has been rejected by the feeling arms and no cigarette is forthcoming, the tilt of the beam is such as to cause one feeler to drop on to the third step on the light side of the deflection plate, and this excessive movement causes the corresponding depending rod to move beyond the switches, so no electric contacts are made and neither recording nor regulating of any kind take place.

Figure 15:
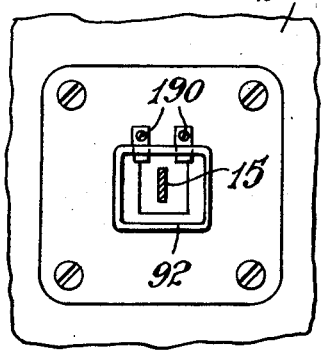
Figure 15 is a view, partly in section, of a fragment of Figure 3, looking in the direction of the arrow D.

It sometimes happens that an extremely light cigarette is produced e. g. before the machine has reached its normal performance or for some particular reason, and this would cause the beam to tilt so far that it would allow a feeler to move on to the "no cigarette" step of the deflection plate. To prevent this a rider 92, Figures 3 and 15, is supported in the frame of the apparatus and lifted when such an abnormal tilt occurs. The rider is a small rectangular loop and is supported on two hooks 190 so arranged that a part of the weighbeam 15 can pass between the hooks and lift the loop. The weight of the rider plus the weight of the cigarette is sufficient to secure a recording of an extremely light cigarette and the consequent regulation of the tobacco feed. If however, a cigarette is entirely missing, the weight of the rider alone is not sufficient to check the beam movement to such an extent that a feeler rests on the extra-light step instead of the "no cigarette" step.

It is customary to provide manual control for the regulating shaft and in this case it consists of a switch OS, Figure 5. The switch has two arms, one for shifting the motor voltage to 24 volts and another coupled to it for directing the current through either contactor to secure the desired direction of rotation which can be turned to start the motor in either direction. As manual control is comparatively coarse the voltage applied to the motor is higher than for automatic control (e. g. 24 volts as against 8 volts) and the motor runs much faster.

What I claim as my invention and desire to secure by Letters Patent is:

1. In apparatus for use with cigarette machines for weighing separate cigarettes, the combination with a rotatable drum having a peripheral portion formed to receive cigarettes in spaced relation with the cigarette axes parallel to the axis of said drum, of means delivering cigarettes to the peripheral portion of said drum, a stripper pivotally supported for displacement from an inoperative position to an operative position to engage and strip cigarettes from said drum, means yieldably urging said stripper toward its inoperative position, a cam, means rotating said cam in timed relation with said drum, a follower engaging said cam and connected to said stripper to displace the latter into its operative position, a stop supported for movement into and out of blocking relation with said follower and stripper to prevent movement of the latter to inoperative position, means driven in timed relation with said drum to move said stop into blocking relation for preventing displacement of said stripper to the inoperative position except during predetermined cycles of rotation of said drum, and a second stripper positioned adjacent said drum and behind said first stripper to engage and strip from said drum cigarettes not stripped by said first stripper.

2. In apparatus for use with cigarette machines for weighing separate cigarettes, the combination with a rotatable drum having a peripheral portion formed to receive cigarettes in spaced relation with the cigarette axes parallel to the axis of said drum, of means delivering cigarettes to the peripheral portion of said drum, a stripper pivotally supported for displacement from an inoperative position to an operative position to engage and strip cigarettes from said drum, means yieldably urging said stripper toward its inoperative position, a first cam, means rotating said first cam in timed relation with said drum, a follower engaging said first cam and connected to said stripper to displace the latter into its operative position, a second cam, means rotating said second cam at a speed which is a fraction of the speed of said first cam, a stop periodically operable by said second cam to a position to engage and prevent movement of said follower, whereby said stop prevents displacement of said stripper to the inoperative position except during predetermined cycles of rotation of said drum, and a second stripper positioned adjacent said drum and behind said first stripper to engage and strip from said drum cigarettes not stripped by said first stripper.

3. In apparatus for use with cigarette machines for weighing separate cigarettes, the combination with a rotatable drum having a peripheral portion formed to receive cigarettes in spaced relation with the cigarette axes parallel to the axis of said drum, of means delivering cigarettes to the peripheral portion of said drum, a stripper pivotally supported for displacement from an inoperative position to an operative position to engage and strip cigarettes from said drum, means yieldably urging said stripper toward its inoperative position, a first cam, means rotating said first cam in timed relation with said drum, a follower engaging said first cam and connected to said stripper to displace the latter into its operative position, a second cam, means rotating said second cam at a speed which is a fraction of the speed of said first cam, a stop periodically operable by said second cam to a position to engage and prevent movement of said follower, whereby said stop prevents displacement of said stripper to the inoperative position except during predetermined cycles of rotation of said drum, manually operable means for retaining said stop in follower engaging position to render said stripper continuously operative, and a second stripper positioned adjacent said drum and behind said first stripper to engage and strip from said drum cigarettes not stripped by said first stripper.

4. In apparatus for use with cigarette machines for weighing separate cigarettes, the combination with a rotatable drum having a peripheral portion formed to receive cigarettes in spaced relation with the cigarette axes parallel to the axis of said drum, of means delivering cigarettes to the peripheral portion of said drum, a stripper pivotally supported for displacement from an inoperative position to an operative position to engage and strip cigarettes from said drum, means yieldably urging said stripper toward its inoperative position, a cam, means rotating said cam in timed relation with said drum, a follower engaging said cam and connected to said stripper to displace the latter into its operative position, devices driven in timed relation with said drum to engage and prevent movement of said follower and stripper during selected cycles of rotation of said drum, and a second stripper positioned adjacent said drum and behind said first stripper to engage and strip from said drum cigarettes not stripped by said first stripper.

CYRIL BEST.

REFERENCES CITED

The following references are of record in the file of this patent:

UNITED STATES PATENTS

| Number | Name | Date |
|---|---|---|
| 1,864,728 | Hawkins | June 28, 1932 |
| 2,083,173 | Ruau | June 8, 1937 |
| 2,343,240 | Molins et al. | Mar. 7, 1944 |

FOREIGN PATENTS

| Number | Country | Date |
|---|---|---|
| 769,232 | France | June 5, 1934 |
| 587,210 | Great Britain | Apr. 17, 1947 |